(12) United States Patent
Hoppe et al.

(10) Patent No.: US 10,309,271 B2
(45) Date of Patent: Jun. 4, 2019

(54) CENTRAL VALVE FOR A CAMSHAFT ADJUSTMENT DEVICE

(71) Applicant: Schaeffler Technologies AG & Co. KG, Herzogenaurach (DE)

(72) Inventors: Jens Hoppe, Erlangen (DE); Markus Kinscher, Lauf a.d. Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 24 days.

(21) Appl. No.: 15/540,285

(22) PCT Filed: Jan. 14, 2016

(86) PCT No.: PCT/DE2016/200012
§ 371 (c)(1),
(2) Date: Jun. 28, 2017

(87) PCT Pub. No.: WO2016/112908
PCT Pub. Date: Jul. 21, 2016

(65) Prior Publication Data
US 2017/0356313 A1 Dec. 14, 2017

(30) Foreign Application Priority Data
Jan. 15, 2015 (DE) ........................ 10 2015 200 542

(51) Int. Cl.
*F01L 1/344* (2006.01)
*F01L 1/047* (2006.01)
(Continued)

(52) U.S. Cl.
CPC ............. *F01L 1/3442* (2013.01); *F01L 1/047* (2013.01); *F01L 1/344* (2013.01); *F01L 5/14* (2013.01);
(Continued)

(58) Field of Classification Search
CPC ..... F01L 2001/3443; F01L 2001/34433; F01L 2001/34479; F01L 1/46
(Continued)

(56) References Cited

U.S. PATENT DOCUMENTS 7,243,626 B2 * 7/2007 Strauss .................... F01L 1/34
123/90.12
8,893,676 B2 11/2014 Hoppe et al.
(Continued)

FOREIGN PATENT DOCUMENTS

DE       102009031701      1/2011
DE    10 2011 003 556 A1    8/2012
(Continued)

OTHER PUBLICATIONS

International Search Report of PCT/DE2016/200012 dated Apr. 29, 2016, 2 pages.

*Primary Examiner* — Jorge L Leon, Jr.
(74) *Attorney, Agent, or Firm* — Davidson, Davidson & Kappel, LLC

(57) ABSTRACT

A central valve for a camshaft adjuster, and to an internal combustion engine, which includes a camshaft, a camshaft-adjusting device, and a central valve. The central valve includes a shaped part as a valve housing (3), including a control piston (4) guided coaxially within the valve housing (3) in such a way that the control piston can move axially and including a stop, which limits the mobility of the control piston in an axial direction (piston stop). The piston stop is a piston stop washer (5), wherein the piston stop washer and the valve housing (3) are joined.

12 Claims, 3 Drawing Sheets

(51) Int. Cl.
  *F01L 5/14* (2006.01)
  *F16K 11/07* (2006.01)
  *F16K 27/04* (2006.01)

(52) U.S. Cl.
  CPC ........ *F16K 11/0704* (2013.01); *F16K 27/048* (2013.01); *F01L 2001/3443* (2013.01); *F01L 2001/34433* (2013.01); *F01L 2001/34456* (2013.01); *F01L 2103/01* (2013.01)

(58) Field of Classification Search
  USPC .................................................... 123/90.17
  See application file for complete search history.

(56) References Cited

U.S. PATENT DOCUMENTS

| | | |
|---|---|---|
| 8,910,603 B2 | 12/2014 | Bayrakdar et al. |
| 2013/0200284 A1 | 8/2013 | Hiyama et al. |
| 2013/0213330 A1* | 8/2013 | Hoppe ................... F01L 1/344 123/90.17 |
| 2013/0312677 A1* | 11/2013 | Bayrakdar ............ F01L 1/3442 123/90.12 |
| 2015/0144211 A1 | 5/2015 | Kinscher et al. |
| 2015/0292625 A1 | 10/2015 | Kohler et al. |

FOREIGN PATENT DOCUMENTS

| | | |
|---|---|---|
| DE | 10 2012 202 520 A1 | 8/2013 |
| DE | 10 2013 203 951 A1 | 11/2013 |
| DE | 102012220830 | 5/2014 |
| DE | 102013209349 | 11/2014 |

\* cited by examiner

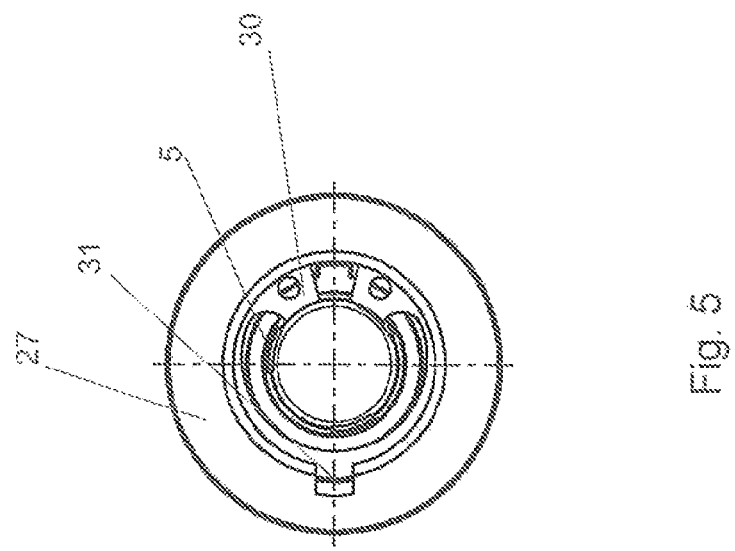
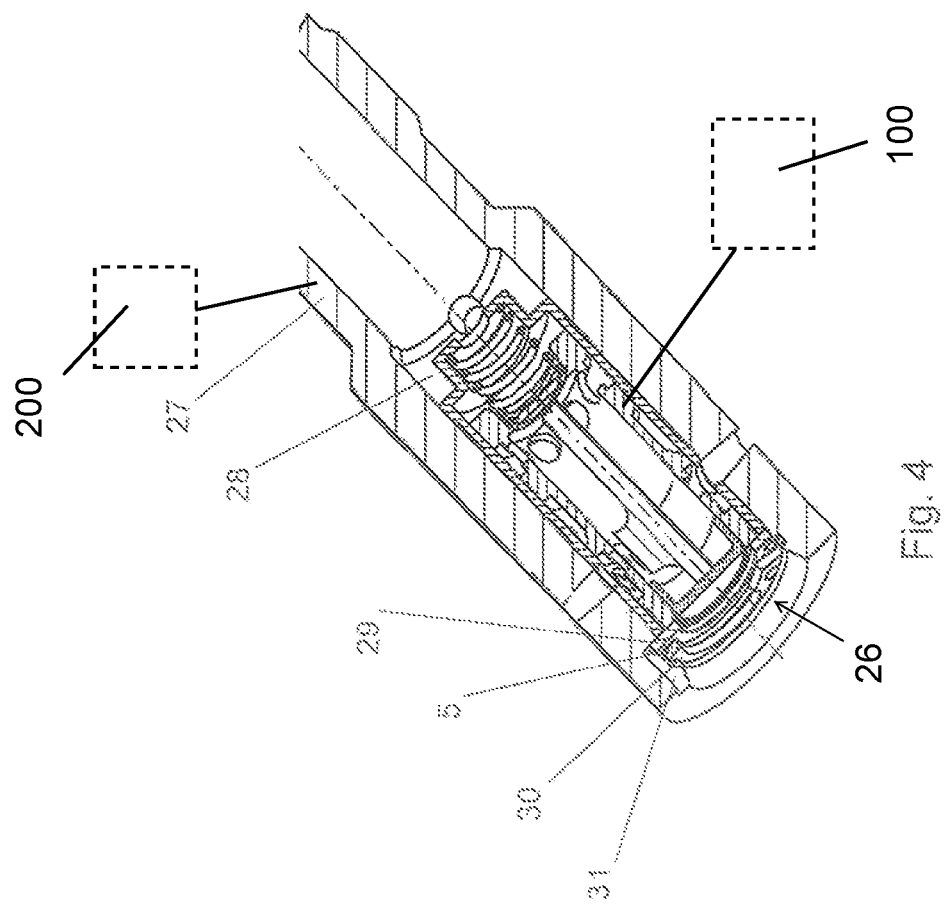

CENTRAL VALVE FOR A CAMSHAFT ADJUSTMENT DEVICE

The present invention is directed to the field of proportional directional control valves, which may be used as a central valve, in particular for controlling so-called camshaft adjusters. Camshaft adjusters are used for controlling the operation of an internal combustion engine by influencing the charge cycle in a targeted manner: An adjustment of the phase position of the camshaft changes its position in relation to the phase position of the crankshaft; the opening and closing times of the gas exchange valves may thus be shifted to an earlier or later point in time of the run-through cyclical process. Central valves have multiple switching positions, with the aid of which the course of a pressure medium path may be adjusted between an inflow and an outflow; the pressure medium flow exerts a force on the camshaft adjuster that is a function of the switching position and effectuates an adjustment into a certain position.

BACKGROUND

This type of proportional directional control valve is the subject matter of Published Unexamined German Patent Application DE 10 2011 003 556 A1, for example. A control valve, designed as a central valve, for controlling the inflow and outflow of hydraulic medium to and from a camshaft adjustment device is provided. A control piston is axial displaceably situated in the plastic valve housing, a locking ring being provided for the form-locked fixing of the valve housing in a camshaft or in a rotor of the camshaft adjustment device. The locking ring has a radially extending circumferential section that is designed for engaging with an annular groove formed in the camshaft or the rotor.

Another central valve of this type is provided in DE 10 2012 220 830 A1. A control piston is axially displaceably guided within a sleeve that is extrusion-coated with plastic. The guide sleeve in turn is situated in a housing that is designed as a central screw, and is secured in position with the aid of a locking ring inserted into a groove. The movability of the control piston is limited on the one hand by a sleeve base, and on the other hand by a stop element. The stop element is designed as a component that is separate from the guide sleeve and joined to the sleeve in an integrally bonded or form-locked manner, for example with the aid of a snap connection.

A central valve that includes a two-part central screw is provided in DE 10 2013 203 951 A1. The central screw is made up of a screw shank and a screw sleeve that is designed as a deep-drawn part. A control piston situated in a guide sleeve extrusion-coated with plastic is contactable with a stop element, the stop element being a locking ring which is inserted into a groove in the screw sleeve and at the same time fixes the guide sleeve within the screw sleeve.

Another housing of a central valve, which arises from a deep-drawing process, is provided in DE 10 2012 202 520 A1. A central valve for a camshaft adjuster, including a control piston that is axially movably guided within a valve housing, is provided. The housing is manufactured by a deep-drawing process, and is designed as a screw that includes a screw head, a screw shank, and a thread. The screw head of the housing includes a collar with a flange surface that may be supported on the camshaft adjuster. The screw head also includes a contact surface for an assembly tool.

SUMMARY OF THE INVENTION

It is an object of the present invention to provide a central valve that has a simplified design.

The present invention provides a control valve for a camshaft adjustment device, including a shaped part as a valve housing, with a control piston that is coaxially and axially movably guided within the valve housing, and a piston stop that limits the movability of the control piston in an axial direction, the piston stop being a piston stop washer, and the piston stop washer and the valve housing being joined.

The valve housing has one or multiple notches in the area of the piston stop, the piston stop washer having one or multiple radial expansions, adapted to the notches, with the aid of which the piston stop washer and the valve housing are nondetachably joined in the area of the notches. The piston stop washer in the area of a radial expansion has a larger radius than the valve housing (overhang).

The design with an overhang has particular advantages for the installation of the central valve. The overhang may be utilized, for example, as an axial stop, as anti-twist protection, and as installation orientation. The central valve yields further advantages in that it may be put together as a preassembled unit, tested for functional capability, and inserted into the receptacle of a camshaft.

A permanent, nondetachable connection between the piston stop washer and the valve housing is established, for example, by caulking, pressing, and gluing, as well as joining by welding and soldering. The piston stop washer may be designed as a disk, as a disk having a recess, and as a ring. An oil-conducting sleeve may be situated between the control piston and the valve housing, grooves being formed on the outer circumferential surface of the oil-conducting sleeve which, together with the inner circumferential surface of the valve housing, form oil-conducting channels, it being possible to provide through openings on the groove base.

The housing preferably includes an inflow connection, an outflow connection, and a control connection A and a control connection B. By moving the control piston in a targeted manner, different pressure medium paths within the central valve may be implemented, as the result of which the central valve may assume a switching position having a defined oil-conducting logic system. For this purpose, the control piston has control edges, which together with the inner circumferential surface of the housing or of an oil-conducting sleeve form circulating pressure medium channels.

In one advantageous implementation, the control piston at a first end is acted on by the force of a spring, and at a second end has an actuating surface on the end-face side, the piston stop washer being situated at the second end and having a recess. The actuating surface may be brought into contact with an electromagnetically or hydraulically controlled actuator, for example via an actuating pin that protrudes through the recess in the piston stop washer. With the aid of the actuator, the control piston may be axially moved against the force of the spring and set to an axial position. Different pressure medium paths that extend through the valve may be set in this way. At its first end the valve housing may include a spring receptacle, in which the spring is guided and is supported against the housing.

In one advantageous specific embodiment, the valve housing is a deep-drawn component. As a result of the deep drawing, the edge zones of the wall of the housing are advantageously provided with increased strength, and at the same time material and manufacturing costs are saved. The valve housing may have a thin-walled design, which results in advantages with regard to installation space requirements and weight.

Machining of the valve housing may be largely dispensed with, as the result of which material and tool costs are saved and the cycle time is reduced: sleeve- or tube-shaped workpieces as well as thin-walled metal sheets are suitable as blanks. The blank is shaped, using a punch and a die, in such a way that the valve housing acquires the necessary contours. The valve housing is thus ideally manufactured in an off-tool process.

Nonetheless, metal finishing may be carried out, for example on the functional surfaces of the valve housing. These are primarily the surfaces at which a relative movement between components may occur, for example at the interface between the control piston and the valve housing. In addition, metal finishing is suitable in the area of passages with narrow tolerances, whose quality may be improved by grinding, for example. Grooves provided on the circumference may be provided by rolling, for example, and passages may be provided by punching.

In another advantageous specific embodiment, the valve housing has two notches in the area of the piston stop washer, the piston stop washer having two radial expansions, adapted to the notches, with the aid of which the piston stop washer and the valve housing are caulked in the area of the two notches. Joining with the aid of caulking shows particular advantages in the structural configuration of the valve housing and the piston stop washer, which may be implemented in a particularly cost-effective manner. In addition, a permanent connection between the components may be ensured.

The present invention also provides an internal combustion engine that includes a camshaft, a camshaft adjustment device, and a central valve. The valve housing is concentrically situated in a borehole of the camshaft, and the valve housing has a radial passage, as a supply connection, that is axially situated in the area of a corresponding radial passage in the camshaft.

In principle, an inflow connection, an outflow connection, and control connections are suitable as a supply connection. Hydraulic medium is conveyed by the hydraulic medium pump, and via the inflow connection arrives in the central valve. As a function of the switching position of the control piston, a predetermined pressure medium path is implemented, via which the inflowing hydraulic medium may be led to one of the control connections. The hydraulic medium leaves the central valve via the control connections and arrives at the camshaft adjuster in order to be controlled.

The central valve is accordingly designed for controlling a camshaft adjuster; it is thus situated in a cavity in the camshaft and rotates along with same. Camshaft adjusters having the design of a vane cell adjuster, for example, contain a stator and a rotor as essential elements. The stator is rotatably fixedly connected to a drive wheel, and is driven by the crankshaft via a traction mechanism drive. The rotor forms the output element.

The rotor is situated concentrically with respect to the stator and is enclosed by same. Situated in the stator in the circumferential direction is an indentation which, without limiting the movability between the rotor and the stator in the circumferential direction, is closed with respect to a pressure-tight cavity: laterally, by a cover and by a side wall, and at the inner diameter by the outer circumferential wall of the rotor. A vane, which is fixedly connected to the rotor and which divides the cavity into two chambers A and B that are closable in a pressure-tight manner, engages with the cavity.

By the targeted connection of pressure chambers A and B either to inflow connection P or to outflow connection T, a pressure difference may be generated, causing a force to act on the vane. The vane is thus displaced together with the rotor in the circumferential direction.

The displacement of the rotor results in a change in the phase position of the camshaft in relation to the phase position of the crankshaft: If the camshaft rotates in the clockwise direction and pressure chamber B moves ahead of pressure chamber A, an adjustment of the vane in the direction of pressure chamber B effectuates an adjustment of the opening and closing times at an earlier point in time.

In one advantageous implementation, the valve housing has an axially circumferential groove on its circumference in the area of the supply connection. Such grooves are basically used for distributing the hydraulic medium at the transition between the valve housing and the camshaft or rotor of a camshaft adjuster. Due to the design of the groove on the outer circumference of the valve housing, machining of the inner circumference of the camshaft borehole is dispensed with. Grooves may be provided by rolling in the area of one or multiple supply connections.

In another advantageous implementation, the valve housing is enclosed by the borehole of the camshaft, the camshaft having a stop surface against which the valve housing may be supported with the aid of the overhang. The valve housing is preferably completely enclosed by the camshaft borehole. One advantage of the implementation is that the relative position between the valve housing and the camshaft may be fixed. The overhang cooperates with the stop surface in such a way that protection against axial displacement in the direction of the first end is provided.

In one advantageous specific embodiment, the stop surface and the overhang cooperate in such a way that the movability of the valve housing is limited axially in the direction of the first end, or is limited axially in the direction of the first end and in the circumferential direction, a locking ring situated on the inner circumferential surface of the borehole of the camshaft limiting the movability of the valve housing axially in the direction of the second end.

Accordingly, the stop surface is preferably designed in such a way that it rests vertically on the axis of the camshaft and in parallel to an end face of the camshaft. The stop surface is axially offset with respect to an end face of the camshaft, and in the circumferential direction is delimited by a wall: the stop surface is preferably implemented by an axial groove, on the inner circumferential surface of the camshaft borehole, which ends at the stop surface.

A locking ring limits the movability of the valve housing axially in the direction of the second end. The specific embodiment has particular advantages in that, first, the central valve may be preassembled as a unit and tested for functional capability. Second, with the aid of the overhang and the stop surface an orientation of the central valve with respect to the camshaft is permanently ensured, in that anti-twist protection, an orientation, and protection against axial displacement are provided.

A third advantage is that the design of the central valve housing as a central screw that includes a screw head, screw shank, and external thread on the screw shank is simplified. Fastening the borehole of the camshaft takes place solely with the aid of the anti-twist protection and the locking ring.

BRIEF DESCRIPTION OF THE DRAWINGS

The present invention is now explained in greater detail based on one exemplary embodiment, with reference to the drawings. Functionally equivalent elements of the explained specific embodiments are denoted by the same reference numerals.

FIG. 4 shows a perspective longitudinal section of a camshaft together with the central valve from FIG. 1; and FIG. 5 shows a front side of the camshaft together with the central valve from FIG. 4.

DETAILED DESCRIPTION

Figure 1:
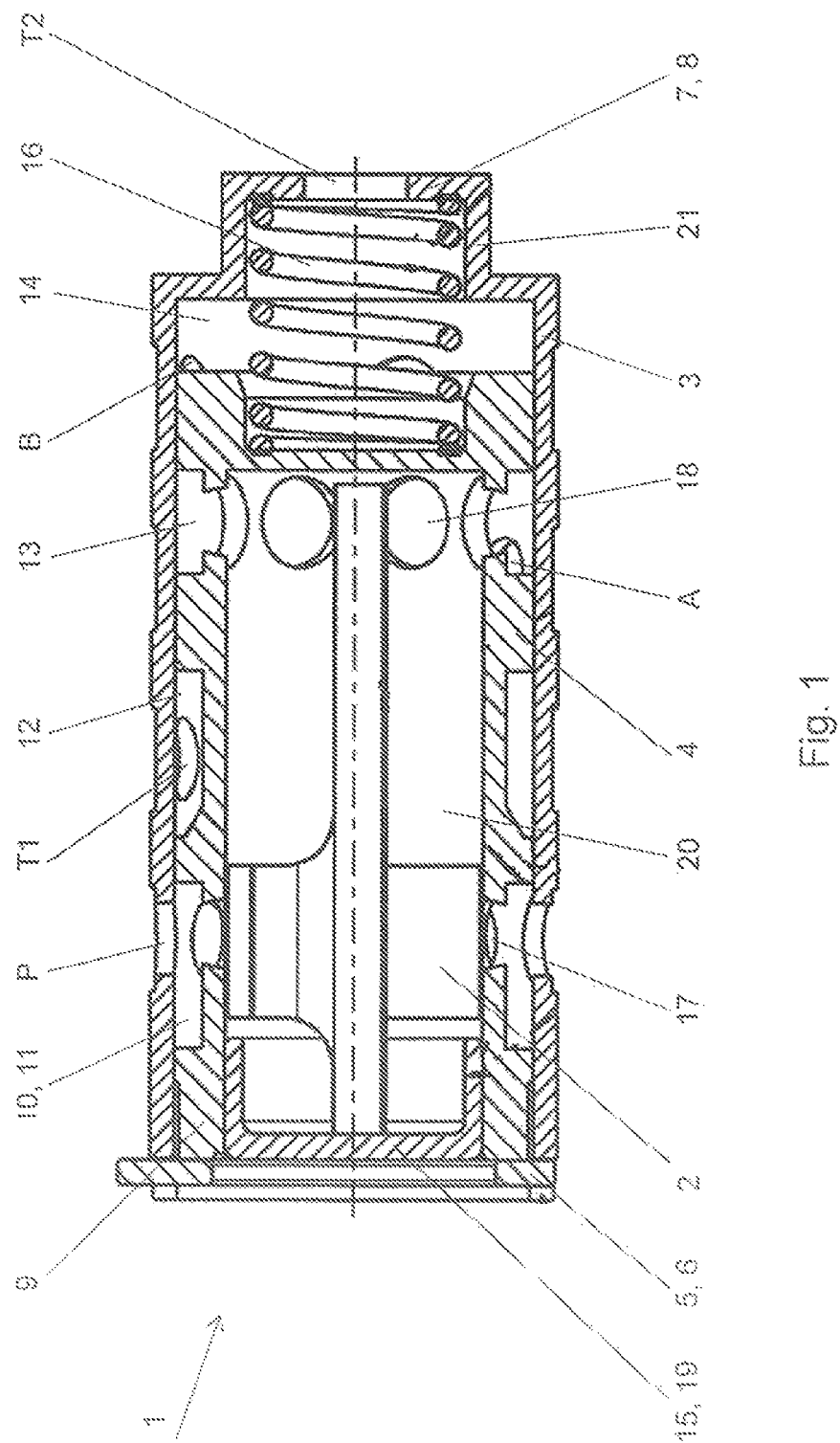
FIG. 1 shows a longitudinal section of the central valve.

FIG. 1 shows in the longitudinal section one specific embodiment, by way of example, of a control valve 1 designed as a central valve, and which includes a check valve 2. Control valve 1 is made up of a valve housing 3 and a hollow cylindrical control piston 4 that is axially movably guided in a corresponding cavity in valve housing 3. The adjustment range of control piston 4 is axially delimited by a piston stop washer 5 on first end 6 and by an end element or housing base 7 on second end 8.

Control piston 4 on its outer circumferential surface has four sections with an expanded diameter 9, which include three sections with a reduced diameter 10. These, together with the inner circumferential surface of the valve housing, form a first, a second, and a third circumferential annular channel, i.e., inflow groove 11, outflow groove 12, and control groove 13, respectively. The second outflow takes place via an axial cavity 14 between the control piston and the valve housing at second end 8. For controlling a camshaft adjuster, control piston 4 may assume different switching positions that are characterized by the actual pattern of possible pressure medium paths. A switching position is implemented with the aid of an actuator device 100 defining a camshaft-actuating device for an internal combustion engine 200 (both shown solely schematically), which generally is an electromagnetically activated actuator.

A push rod which is connected to an armature of the electromagnet and which engages through a recess in the piston stop washer is brought into contact with an actuating surface 15 at the front side of control piston 4; the force acting on the armature is thus transmitted via the push rod to the control piston and effectuates its axial displacement against the force of a spring 16 positioned in a spring seat 21 stamped out on valve housing 3: The first annular channel/inflow groove 11 may thus be brought into connection with inflow connection P, and the second annular channel/outflow groove 12 may be brought into connection with outflow connection T. The third annular channel/control groove 13 may be brought into connection with first control connection A.

A first through opening 17 is provided on the groove base of inflow groove 11, which forms the first annular channel, and a second through opening 18 is provided on the groove base of the control groove that forms the third annular channel. Except for first and second through openings 17, 18, control piston 4 is closed on the side facing away from the spring by a pressure piece 19. Hydraulic medium may thus be conducted via inflow connection P into piston cavity 20, and from there to control connections A, B. Control connection A may be brought into connection with outflow connection T1 via the second annular channel/the outflow groove, and control connection B may be brought into connection with outflow connection T2 via axial cavity 14.

Figure 3:
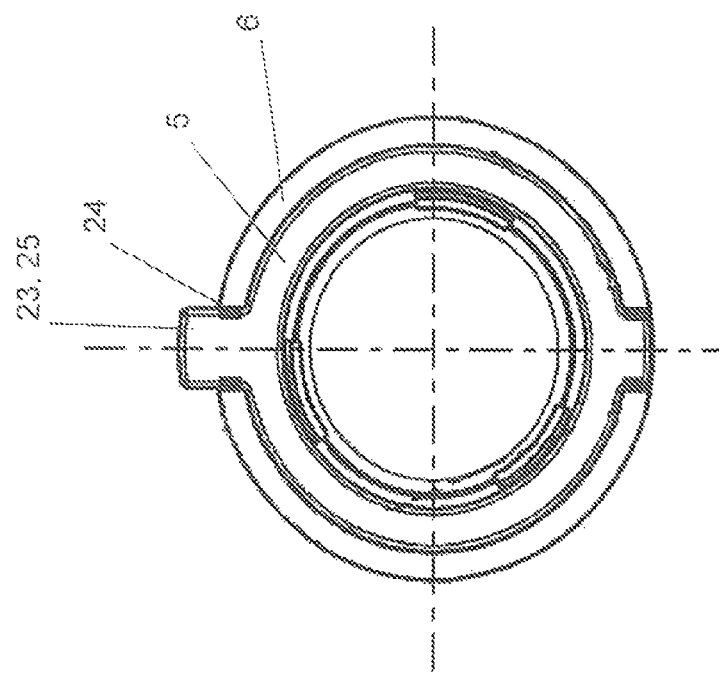
FIG. 3 shows a front side of the central valve from FIG. 1.
Figure 2:
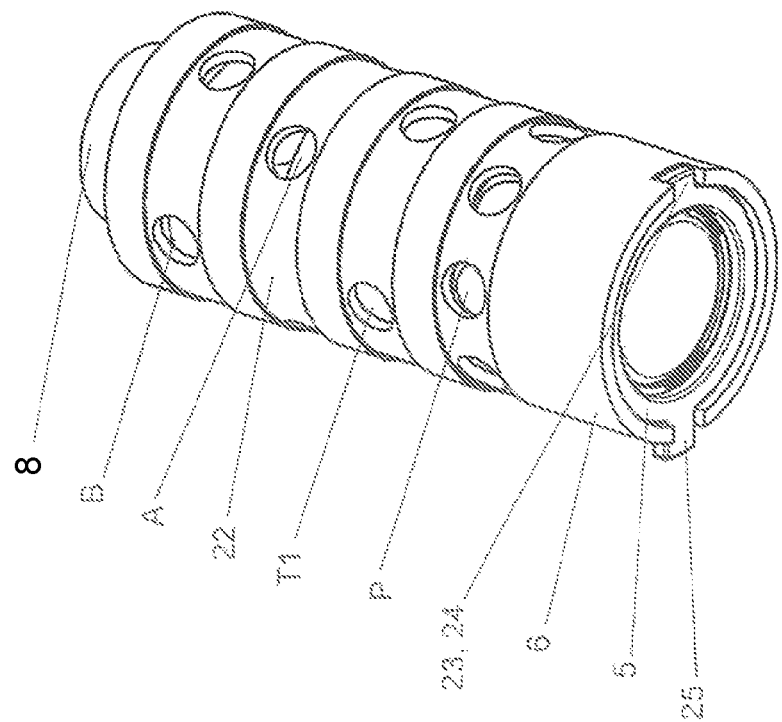
FIG. 2 shows a perspective view of the central valve from FIG. 1.

FIG. 2 shows the valve housing in a perspective view. Valve housing 3 has four openings on its outer circumference: The openings form inflow connection P and outflow connection T1, as well as control connection A and control connection B. The connections are situated on the base of circumferential grooves 22, which are introduced into the outer circumferential surface of the valve housing by rolling. Piston stop washer 5 is situated on first end 6. The piston stop washer has two radial expansions 23 which engage with corresponding notches 24 on the valve housing. One of the radial expansions has a radius that is larger than the radius of valve housing 3; an overhang 25 is thus formed. The view of the front side of first end 6 in FIG. 3 illustrates the configuration of piston stop washer 5 and of overhang 25.

FIG. 4 shows a perspective longitudinal section of a camshaft together with the central valve from FIG. 1. Valve housing 3 is concentrically situated in a borehole 26 of camshaft 27, and as inflow connection P, valve housing 3 has a radial passage that is situated axially in the camshaft in the area of a corresponding radial passage 28. Hydraulic medium is conveyed by the hydraulic medium pump, and via inflow connection P arrives in the central valve. As a function of the switching position of the control piston, a predetermined pressure medium path is implemented, via which the inflowing hydraulic medium may be led to one of control connections A, B. The hydraulic medium leaves central valve 1 via control connections A, B and arrives at the camshaft adjuster (not shown) in order to be controlled.

Central valve 1 is accordingly designed for controlling a camshaft adjuster; it is thus situated in a borehole 26 of camshaft 27 and rotates along with same. Camshaft adjusters having the design of a vane cell adjuster contain a stator and a rotor as essential elements. The stator is rotatably fixedly connected to a drive wheel, and is driven by the crankshaft via a traction mechanism drive. The rotor forms the output element.

Valve housing 3 is completely enclosed by borehole 26 of camshaft 27, the camshaft having a stop surface 29 against which valve housing 3 may be supported with the aid of overhang 25. Overhang 25 cooperates with stop surface 29 in such a way that safeguarding against axial displacement in the direction of first end 6 is provided.

Stop surface 29 and overhang 25 cooperate in such a way that the movability of the valve housing is limited axially in the direction of first end 6 and in the circumferential direction, a locking ring 30 situated on the inner circumferential surface of the borehole of the camshaft limiting the movability of the valve housing axially in the direction of second end 8.

Stop surface 29 is designed in such a way that it rests vertically on the axis of camshaft 27 and in parallel to an end face of the camshaft. Stop surface 29 is axially offset with respect to an end face of the camshaft, and in the circumferential direction is delimited by a wall: the stop surface is implemented by an axial groove 31, on the inner circumferential surface of the camshaft borehole, which ends at the stop surface. A locking ring limits the movability of the valve housing axially in the direction of second end 8. FIG. 5 illustrates a view of the end face of the camshaft. Locking ring 30 holds central valve 1 in the borehole of camshaft 27, valve housing 3 being secured against rotation and axial displacement via piston stop washer 5 with the aid of overhang 25 which is inserted into axial groove 31.

LIST OF REFERENCE NUMERALS 1 control valve
2 check valve
3 valve housing
4 control piston 5 piston stop washer
6 first end
7 end element, housing base
8 second end
9 section with expanded diameter
10 section with reduced diameter
11 inflow groove
12 outflow groove
13 control groove
14 axial cavity
15 actuating surface
16 spring
17 first through opening
18 second through opening
19 pressure piece
20 piston cavity
21 spring seat
22 circumferential groove
23 radial expansion
24 notch
25 overhang
26 borehole (of the camshaft)
27 camshaft
28 radial passage
29 stop surface
30 locking ring
31 axial groove
100 camshaft-adjusting device
200 internal combustion engine
A control connection A
B control connection B
P inflow connection P
T1 outflow connection T1
T2 outflow connection T2

What is claimed is:

1. A central valve for a camshaft adjustment device, the central valve comprising:
a shaped part valve housing;
a control piston coaxially and axially movably guided within the valve housing; and
a piston stop that limits a movability of the control piston in an axial direction, the piston stop being a piston stop washer, the piston stop washer and the valve housing being joined,
the valve housing having at least one notch in a stop area of the piston stop washer, the piston stop washer having at least one radial expansion adapted to the at least one notch, the piston stop washer and the valve housing via of the at least one radial expansion being permanently non-detachably joined in a notch area of the at least one notch, the piston stop washer in a radial expansion area of the at least one radial expansion having a larger radius than the valve housing,
wherein the at least one radial expansion includes a first radial expansion and a second radial expansion, the first radial expansion extending further radially outward from a center of the piston stop washer than the second radial expansion.

2. The central valve as recited in claim 1 wherein the piston stop washer at the larger radius defines an overhang.

3. The central valve as recited in claim 1 wherein the control piston at a first end is acted on by force of a spring, and at a second end has an actuating surface on an end-face side, the piston stop washer being situated at the second end having a recess.

4. The central valve as recited in claim 1 wherein the valve housing is a deep-drawn part.

5. The central valve as recited in claim 1 wherein the at least one notch includes two notches in the stop area of the piston stop washer, the at least one radial expansion including two radial expansions adapted to the two notches, the piston stop washer and the valve housing being caulked via the two radial expansions in an area of the two notches.

6. The central valve as recited in claim 1 wherein the piston stop washer is a continuous ring.

7. The central valve as recited in claim 1 wherein an inner circumferential surface of the piston stop washer has a uniform diameter.

8. An internal combustion engine comprising:
a camshaft;
a camshaft adjustment device; and
a central valve for the camshaft adjustment device, the central valve comprising:
a shaped part valve housing;
a control piston coaxially and axially movably guided within the valve housing; and
a piston stop that limits a movability of the control piston in an axial direction, the piston stop being a piston stop washer, the piston stop washer and the valve housing being joined,
the valve housing having at least one notch in a stop area of the piston stop washer, the piston stop washer having at least one radial expansion adapted to the at least one notch, the piston stop washer and the valve housing with an aid via of the at least one radial expansion being permanently non-detachably joined in a notch area of the at least one notch, the piston stop washer in a radial expansion area of the at least one radial expansion having a larger radius than the valve housing,
wherein the at least one radial expansion includes a first radial expansion and a second radial expansion, the first radial expansion extending further radially outward from a center of the piston stop washer than the second radial expansion,
the valve housing being concentrically situated in a borehole of the camshaft, and the valve housing having a radial passage, as a supply connection, axially situated in a passage area of a corresponding radial passage in the camshaft.

9. The internal combustion engine as recited in claim 8 wherein the valve housing has a circumferential groove on an outer surface of the valve housing in a passage area of the corresponding radial passage.

10. The internal combustion engine as recited in claim 8 wherein the piston stop washer at the larger radius defines an overhang and wherein the valve housing is enclosed by the borehole of the camshaft, the camshaft having a stop surface, the valve housing being supported via of the overhang against the stop surface.

11. The internal combustion engine as recited in claim 10 wherein the stop surface and the overhang cooperate in such a way that a movability of the valve housing is limited axially in a direction of a first end of the control piston, or is limited axially in the direction of the first end and in a circumferential direction, a locking ring being situated on an inner circumferential surface of the borehole of the camshaft limiting the movability of the valve housing axially in a direction of a second end of the control piston.

12. A central valve for a camshaft adjustment device, the central valve comprising:
a shaped part valve housing;
a control piston coaxially and axially movably guided within the valve housing; and a piston stop that limits a movability of the control piston in an axial direction, the piston stop being a piston stop washer, the piston stop washer and the valve housing being joined, the valve housing having at least one notch in a stop area of the piston stop washer, the piston stop washer having at least one radial expansion adapted to the at least one notch, the piston stop washer and the valve housing via of the at least one radial expansion being permanently non-detachably joined in a notch area of the at least one notch, the piston stop washer in a radial expansion area of the at least one radial expansion having a larger radius than the valve housing, wherein the piston stop washer has at least one arcuate outer circumferential surface section past which the at least one radial expansion protrudes radially, the at least one arcuate outer circumferential surface section being circumferentially wider than the at least one radial expansion.

* * * * *